(12) United States Patent
Kinser et al.

(10) Patent No.: US 8,265,846 B2
(45) Date of Patent: Sep. 11, 2012

(54) METHOD FOR OPERATING A VEHICLE BRAKE SYSTEM

(75) Inventors: Christopher A. Kinser, Grand Blanc, MI (US); Eric E. Krueger, Chelsea, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 559 days.

(21) Appl. No.: 12/413,108

(22) Filed: Mar. 27, 2009

(65) Prior Publication Data

US 2010/0250081 A1    Sep. 30, 2010

(51) Int. Cl.
*G06F 19/00*  (2006.01)
(52) U.S. Cl. .......................... 701/70; 303/191; 303/194
(58) Field of Classification Search .................... 701/70; 303/191, 194
See application file for complete search history.

(56) References Cited

U.S. PATENT DOCUMENTS

| 5,865,515 A * | 2/1999 | Nishizawa ................. 303/194 |
| 2007/0216224 A1 | 9/2007 | Schmitt et al. |

* cited by examiner

*Primary Examiner* — Eric Culbreth
(74) *Attorney, Agent, or Firm* — Lionel D. Anderson; Reising Ethington P.C.

(57) ABSTRACT

A method for reducing or mitigating the effects of vibration in a vehicle brake system, particularly those that can lead to brake groan or other unwanted noise. According to an exemplary embodiment, when the vehicle brake system detects certain vibratory conditions, it makes slight braking adjustments (e.g., adjustments to fluid pressure, brake force, brake torque, etc.) that are aimed to address the brake groan. The vehicle brake system can then determine the effectiveness of the braking adjustments and, if need be, make additional braking adjustments. The method is particularly well suited for use with brake-by-wire systems, but can be used with a number of different vehicle braking systems.

17 Claims, 2 Drawing Sheets

METHOD FOR OPERATING A VEHICLE BRAKE SYSTEM

TECHNICAL FIELD

The present invention generally relates to vehicle brake systems and, more particularly, to methods that mitigate vibration-related effects in a vehicle brake system.

BACKGROUND

Applying the vehicle brakes while the vehicle is moving at a slow speed can sometimes result in a high intensity, low frequency vibration or noise that is commonly referred to as brake groan or creep groan.

Some skilled artisans believe that brake groan is caused by the 'stick-slip' effect, which involves a stick-phase where the brake lining and rotor are momentarily stuck and move together (no slippage at their interface) and a slip-phase when those two components break free of one another (slippage at their interface). Not wanting to be bound by any particular theory, it is believed that the time period of the stick-phase is variable and depends on factors such as speed, brake load, and system stiffness. When the slip-phase begins, the sudden energy burst results in a vibration that can produce an audible oscillation.

SUMMARY OF THE INVENTION

According to one embodiment, there is provided a method for operating a vehicle brake system. The method generally comprises the steps of: (a) gathering brake vibration data; (b) using the brake vibration data to determine if a brake vibration condition exists; (c) if a brake vibration condition does exist, then generating a modified brake command signal that results in a braking adjustment; and (d) operating the vehicle brake system according to the modified brake command signal.

According to another embodiment, there is provided a method for operating a vehicle brake system. The method generally comprises the steps of: (a) gathering a vehicle speed, brake status information, and brake vibration data; (b) using the vehicle speed, brake status information, and the brake vibration data to determine if the vehicle brake system is producing brake groan noise; (c) if the vehicle brake system is producing brake groan noise, then making a first braking adjustment; (d) determining if the first braking adjustment is effective at reducing the brake groan noise; and (e) if the first braking adjustment is not effective at reducing the brake groan noise, then making a second braking adjustment.

According to another embodiment, there is provided a brake-by-wire vehicle brake system. The system generally comprises: a brake pedal sensor for providing brake pedal status information; one or more vibration sensor(s) for providing brake vibration data; an electronic brake control module (EBCM) coupled to the brake pedal sensor and to the vibration sensor(s); and one or more disk brake unit(s) having a brake pad and a brake rotor. The EBCM uses the brake pedal status information and the brake vibration data to determine if a brake vibration condition exists and, if so, generates a modified brake command signal that results in a braking adjustment by the disk brake unit(s).

BRIEF DESCRIPTION OF THE DRAWINGS

Preferred exemplary embodiments of the invention will hereinafter be described in conjunction with the appended drawings, wherein like designations denote like elements, and wherein.

DETAILED DESCRIPTION OF THE PREFERRED EMBODIMENTS

The method described herein reduces or mitigates the effects of vibration in a vehicle brake system, particularly those that can lead to brake groan or other unwanted noise. According to an exemplary embodiment, when a vehicle brake system 10 detects certain vibratory or other undesirable conditions, it makes slight braking adjustments (e.g., adjustments to fluid pressure, brake force, brake torque, etc.) in order to mitigate the brake groan. Although this method is particularly well suited for use with brake-by-wire systems, such as electrohydraulic braking (EHB) and electromechanical braking (EMB) systems, it should be appreciated that it may also be used with any number of other braking systems and is not limited to the disclosed embodiment. For example, the present method may be used with other brake-by-wire and non-brake-by-wire systems, regenerative and non-regenerative braking arrangements (e.g., those found in hybrid vehicles, electric vehicles, etc.), as well as other brake technologies (e.g., disk brakes, drum brakes or a combination thereof). These are only some of the possibilities, as the present method could be used with other vehicle brake systems as well.

Figure 1:
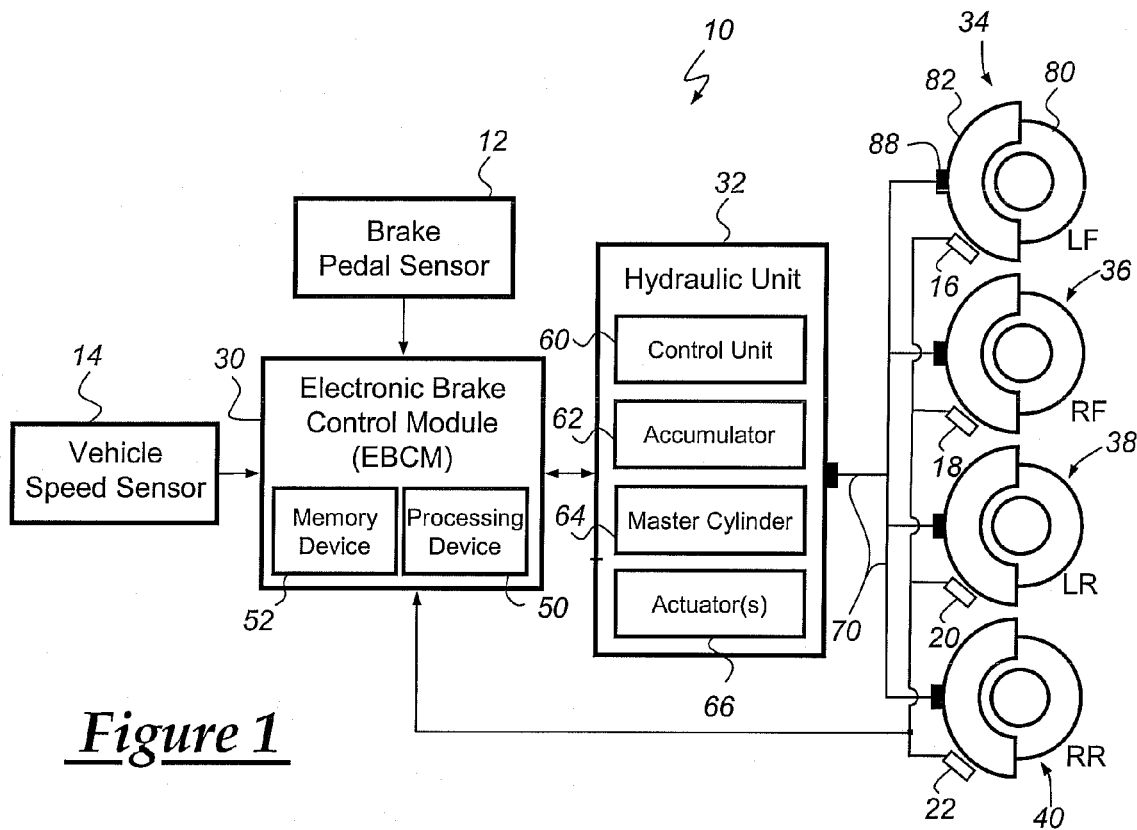
FIG. 1 is a block diagram of an exemplary vehicle brake system.

With reference to FIG. 1, there is shown a block diagram of an exemplary vehicle brake system 10 that is an electrohydraulic braking (EHB) system and generally includes a brake pedal sensor 12, a vehicle speed sensor 14, vibration sensors 16-22, an electronic module 30, a hydraulic unit 32, and brake units 34-40. Although not shown here, vehicle brake system 10 may be part of a hybrid vehicle that utilizes a combination of frictional and regenerative braking forces to slow down the vehicle. In such an arrangement, the frictional braking forces are generated in a conventional manner and counteract the forward momentum of the vehicle through friction created by disk brakes, drum brakes, etc. The regenerative braking forces are generated by operating an electric motor in a reverse direction so that it acts as a generator. This creates an electromagnetically-derived torque that acts against the forward momentum of the vehicle (this process also charges a battery that can later be used to power the vehicle). It is not necessary, however, for vehicle brake system 10 or the present method to be used in a regenerative braking arrangement, as that is only one possible embodiment.

Brake pedal sensor 12 provides vehicle brake system 10 with a brake pedal signal that is generally representative of the position, movement, exerted force, and/or state of the brake pedal (hereafter collectively referred to as 'brake status'). Any number of different types of brake pedal sensors may be used; these include non-contact-type sensors (e.g., optical sensors, electromagnetic sensors, etc.), contact-type sensors (e.g., potentiometers, contact switches, etc.), as well as those that measure the force that the driver exerts against the brake pedal, to name a few. In a brake-by-wire application, brake pedal sensor 12 may be integrated with a brake pedal simulator or emulator that conveys the expected mechanical feel of the brake pedal to the driver. The brake pedal simulator may also include other mechanical and/or electronic components, including sensors, etc.

Vehicle speed sensor 14 provides vehicle brake system 10 with a vehicle speed signal that is generally representative of the speed or velocity of the vehicle. A variety of different vehicle speed sensors and sensing techniques may be used, including those that determine wheel speed, ground speed, accelerator pedal position, clutch pedal position, gear shifter selection, vehicle acceleration, engine speed, engine torque, and throttle valve position, to name but a few.

Vibration sensors 16-22 provide vehicle brake system 10 with brake vibration data that is generally representative of vibrations, noise and/or other mechanical disturbances that occur in and around the brake units. Any sensor, component, device, module, technique and/or method that is capable of gathering or otherwise obtaining brake vibration data may be used. In an exemplary embodiment, each of the vibration sensors 16-22 is an acceleration sensor or accelerometer that is mounted on a shock tower located near a corresponding vehicle corner, which includes a brake unit 34-40. In such an arrangement, the vibration sensor takes readings from the nearby corner and provides analog brake vibration data to electronic module 30; this data is preferably provided in the time domain. Vibration sensors 16-22 may include one or more axes of measurement, and may be based on piezoelectric, capacitance, null-balance, strain gauge, resonance beam, piezoresistive, magnetic induction, and/or microelectromechanical systems (MEMS) principals, to name a few possibilities. It is also possible for vibration sensors 16-22 to be mounted elsewhere on the vehicle, instead of on the shock towers, and to be non-acceleration type sensors. For example, vibration sensors 16-22 could be wheel speed sensors or some other sensing device. Skilled artisans will appreciate that the brake pedal signal, the vehicle speed signal, and the brake vibration data described above may be 'reused' from other devices, modules and/or systems in the vehicle that already gather the information for other purposes. In such a case, the relevant signals or data could simply be provided by the device, module and/or system that is already in possession of the information.

Electronic module 30 is an electronic device or unit that is located in the vehicle and includes an electronic processing device 50 and a memory device 52. Electronic processing device 50 may control certain operational aspects of vehicle brake system 10 by executing various electronic instructions, including those of the present method. Some examples of suitable electronic processing devices include digital and analog microprocessors, microcontrollers, application specific integrated circuits (ASICs), or any other processing device known in the art. Memory device 52 could include any type of electronic memory storage means and may be used to store some of the electronic instructions that make up the present method, as well as sensor readings, look-up tables, and any other data structure that may hold data used by the method described herein. According to one embodiment, electronic module 30 is an electronic brake control module (EBCM) that modulates fluid pressure in the vehicle brake system via command signals sent to hydraulic unit 32. This in turn controls the brake force and the brake torque exerted by brake units 34-40. Electronic brake control module (EBCM) 30 could be a separate electronic module or it could be integrated into a larger module, device, or system such as a traction control system or antilock braking system (ABS).

Hydraulic unit 32 is mounted in the vehicle and is coupled to a hydraulic system that can drive brake units 34-40 located at each of the vehicle wheels or corners. Although hydraulic unit 32 is schematically shown as having a separate hydraulic control unit 60, accumulator 62, master cylinder 64, and actuator(s) 66 co-located with one another, it should be appreciated that any combination of these and/or other devices could instead be provided acccording to some other arrangement known in the art. For example, hydraulic control unit 60 could be integrated within EBCM 30 or some other module and be connected to actuator(s) 66 via electrical connections.

Hydraulic control unit 60 interacts with EBCM 30 and may act as an intermediary or driver for the various electromechanical actuators and devices in hydraulic unit 32. In one example, hydraulic control unit 60 receives brake command signals from EBCM 30, processes those signals, and uses them to operate actuator(s) 66 so that the fluid pressure in hydraulic lines 70 is maintained at a desired pressure. In the case of a disk brake embodiment, the fluid pressure drives brake pistons in brake units 34-40 and controls their exerted brake force and brake torque. Skilled artisans will appreciate that hydraulic control unit 60 may perform any number of different tasks and execute a variety of different instructions, including those of the present method. Because the structure and operation of accumulators, master cylinders, actuators and other components of hydraulic unit 32 are generally known, further description has been omitted here.

Brake units 34-40 are each located at a vehicle corner and, according to one embodiment, each includes a rotor 80, caliper 82, brake piston 88, and brake pads (not shown) and may be part of an electrohydraulic braking (EHB) system or some other brake-by-wire system. As is appreciated by skilled artisans, a tire-wheel assembly (not shown) is attached to a hub with several lug nuts so that the tire, wheel, hub, and rotor 62 all co-rotate together. Brake caliper 82 straddles rotor 80 and carries brake piston 88 so that a compressive and frictional brake force can be applied by brake linings to opposing sides of the rotor during a braking event. The frictional brake forces slow the rotation of rotor 80 and hence the rotation of the tire-wheel assembly and ultimately the vehicle. The brake pistons for each of the different wheels or corners may be: all controlled in unison, controlled on a wheel-by-wheel basis, controlled in groups (e.g., the front wheels are controlled separately from the rear wheels), or controlled according to some other known method. It should be appreciated that the method and system described herein are not limited to use with disk brake systems and could be used with other braking systems and arrangements, including drum brake systems.

Again, it should be appreciated that the preceding descriptions of vehicle brake system 10 and its various components and devices are exemplary and are only provided for purposes of illustration. The method and system described herein may be used with any number of different brake systems and are not limited to these exemplary embodiments.

Figure 2:
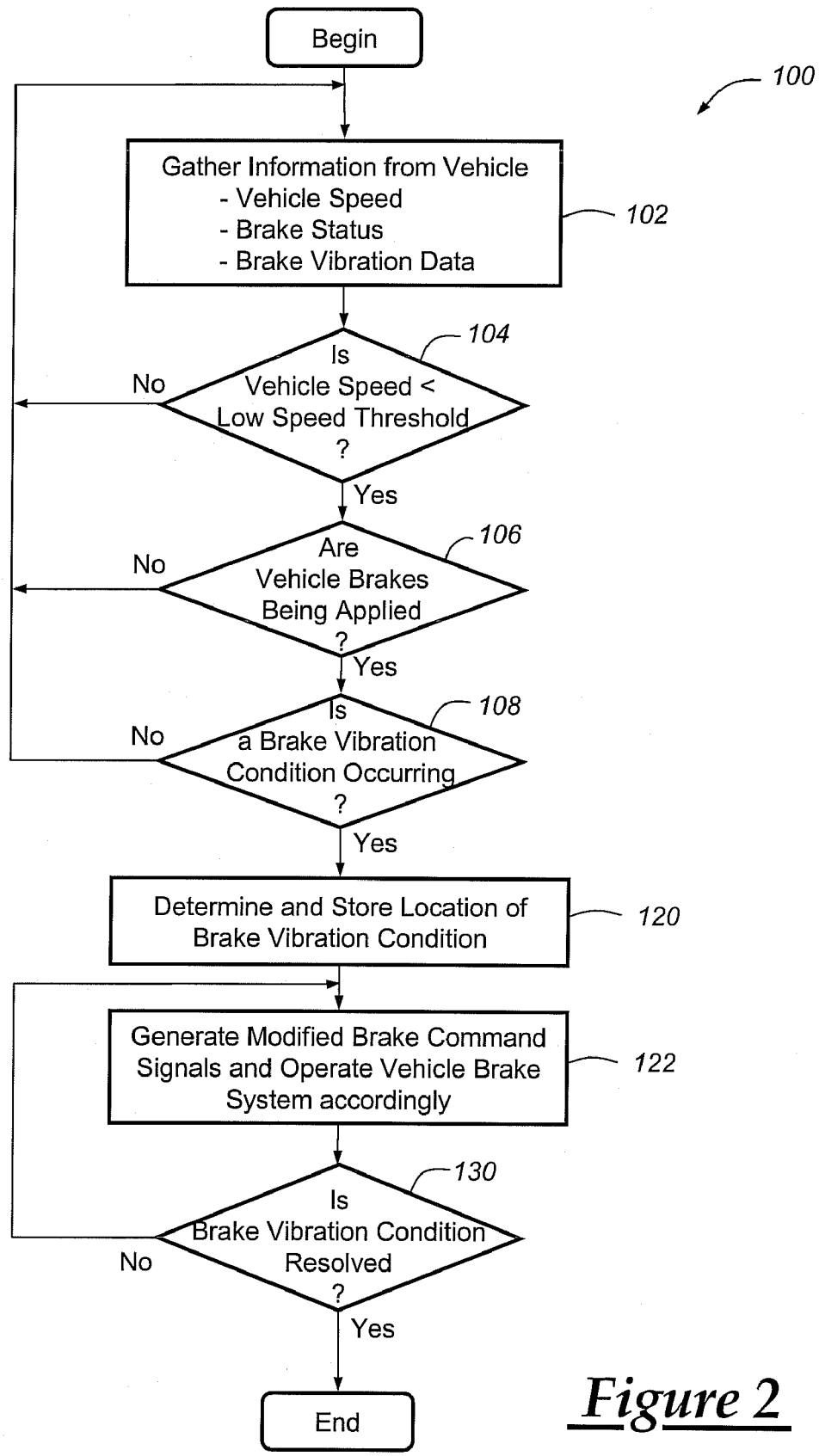
FIG. 2 is a flowchart of an exemplary method that may be used to operate the vehicle brake system of FIG. 1.

Turning now to FIG. 2, there is shown an exemplary method 100 for operating a vehicle brake system and, more particularly, for reducing or mitigating the effects of vibrations that can cause brake groan or other unwanted noise. Brake groan, or creep groan as it is sometimes called, is a high-intensity low-frequency noise or vibratory condition that can exist when a vehicle is braking at relatively low speeds. Some people skilled in the art believe that this brake vibration condition is caused by a 'stick-slip effect' between the brake lining, rotor and/or other frictional components of the vehicle brake system, as already explained.

Beginning with step 102, the method gathers various pieces of information from the vehicle including, but certainly not limited to, vehicle speed, brake status information and/or brake vibration data. The vehicle speed or velocity may be determined from vehicle speed signals provided by vehicle speed sensor 14. Brake status information may be determined from brake pedal signals provided by brake pedal sensor 12 or some other device that is capable of conveying a driver's braking intent. As previously mentioned, brake status information is generally representative of the position, movement, exerted force, and/or state of the brake pedal. Of course, other types of sensors, components, devices and/or modules could provide the aforementioned pieces of information. In one example, the vehicle speed and/or brake status is provided by an electronic module within the vehicle, such as an engine control module or an antilock braking system (ABS) module. Brake vibration data may gathered or otherwise obtained from one of a number of different sources, including vibration sensors 16-22. In an exemplary embodiment, brake vibration data is sent from one or more of the vibration sensors 16-22 to electronic brake control module (EBCM) 30 as analog readings in a time domain. EBCM 30 may digitize the information, convert it into a frequency or other domain, and/or perform any number of other signal pre-processing and processing steps before evaluating the content of those signals, as described below.

Next, step 104 compares the vehicle speed to a low speed threshold in order to determine if the vehicle is moving at a slow enough speed that certain brake vibration conditions are likely to occur. As appreciated by those skilled in the art, brake groan typically does not occur when the vehicle is traveling at a high rate of speed; thus, brake vibrations and noise above the low speed threshold are likely to be the result of some other condition. In one example, the low speed threshold is between 0-20 km/h, however, the exact threshold could depend on the particular vehicle model and brake system. If the vehicle is stopped or is traveling at a higher speed than the low speed threshold, then the method loops back to step 102 for further monitoring. If, however, the vehicle is moving at a speed that is below the low speed threshold, then the method proceeds to step 106 for additional evaluations. It should be appreciated that vehicle speed is only one potential vehicle operating condition that could be used in step 104, as accelerator pedal position, clutch pedal position, gear shifter selection, vehicle acceleration, engine speed, engine torque, throttle valve position, and/or any other suitable vehicle operating condition may be used in lieu of or in addition to vehicle speed. The low speed threshold may be a static value (e.g., set during vehicle design or manufacture) or it may be a dynamic value that is adjusted or calibrated over time (e.g., modified to address changing conditions in the vehicle, environment, driving particularities of the driver, etc.)

Step 106 determines if the vehicle brakes are being applied. Any number of different techniques and methods may be used in step 106 to determine the status of vehicle brake system 10, including those that check for manual and/or automatic braking events. For example, brake pedal sensor 12 can provide electronic brake control module (EBCM) with brake pedal signals that are generally representative of the position, movement, exerted force, and/or state of the brake pedal (collectively the 'brake status'). In this example, the brake status information is indicative of a manual braking event; that is, when the driver manually engages the brake pedal. Alternatively, step 106 may gather information from certain modules or systems in the vehicle, such as an electronic stability control (ESC) module or an anti-lock braking system (ABS) module, in order to determine if the vehicle braking system is being automatically activated. In this example, the brake status information is indicative of an automatic braking event; that is, when a vehicle device, module or system automatically engages or operates the vehicle brakes according to some algorithm. If the vehicle brakes are not being applied, then it is unlikely that a brake vibration condition is occurring and the method loops back to step 102 for further monitoring. If, however, the vehicle brakes are being applied such that a vehicle braking event is underway, then the method proceeds to step 108 for further evaluation. Any number of different techniques may be used in step 106 to determine if a braking event is underway, including the use of vehicle speed sensor 14.

Step 108 determines if a brake vibration condition, such as brake groan or some other unwanted noise, exists or is otherwise occurring. A 'brake vibration condition' broadly pertains to any vibration, noise and/or other mechanical disturbance that occurs in or near a brake unit or vehicle corner. A brake vibration condition may be caused by the 'stick-slip effect', as previously described, and can result in an undesirable brake groan noise that is sensed by one or more of the vibration sensors 16-22. Skilled artisans will appreciate that a number of different techniques and method could be used in step 108 to determine or sense a brake vibration condition. In an exemplary embodiment, electronic brake control module (EBCM) 30 analyzes the brake vibration data from each of the vibration sensors 16-22 by performing one or more of the following functions: digitizing the brake vibration data; converting the brake vibration data from a time domain to a frequency domain through the use of, for example, Fourier transforms and other Fourier techniques; sampling the brake vibration data over a suitable amount of time in order to remove aperiodic components of the signal; filtering the brake vibration data through a filtering mechanism, such as a double high pass filter, in order to evaluate a specific frequency band (e.g., about 0-100 Hz); and comparing the magnitude of the brake vibration data to a noise threshold (e.g., about 50-100 dB) to see if the brake vibration data stays above the noise threshold for a certain duration (e.g., 1 sec). It should be appreciated that the numerical values, thresholds, ranges, etc. provided above and elsewhere in the application are only for purposes of illustration and could easily change depending on the particular vehicle, brake system, brake units, etc. that are involved. Furthermore, any combination of the previous functions, as well as those known in the art but not mentioned here, could be used to evaluate the brake vibration data.

Figure 3:
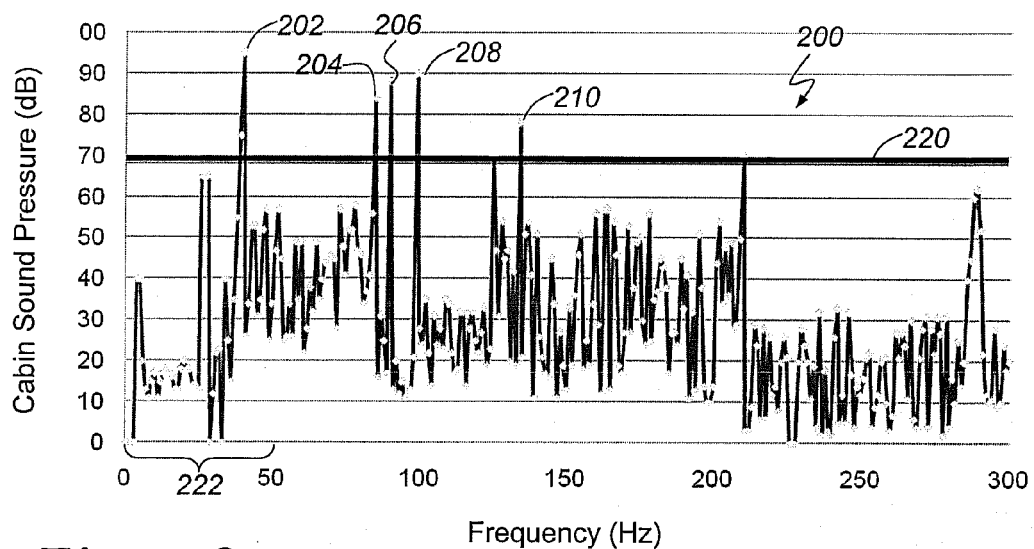
FIG. 3 is a graph illustrating certain vibrations in a vehicle brake system.

Turning now to FIG. 3, there is shown a graph that illustrates exemplary vibrations in a vehicle brake system. In this particular example, brake vibration data 200 has been digitized, converted into the frequency domain, sampled over a certain amount of time to screen out aperiodic and other noisy components, and converted from vibrations ($m/s^2$) to cabin or interior sound pressure (dB), as is appreciated by those skilled in the art. According to this particular plot, brake vibration data 200 has five separate peaks 202-210 that reach above an exemplary noise threshold 220 of 70 dB; however, peaks 204-210 are outside of an exemplary frequency band 222 of 0-50 Hz. As previously explained, brake groan typically exists at low vehicle speeds and therefore usually has a correspondingly low frequency. Noises and vibrations that occur above this frequency band of interest are probably caused by other factors and are thus not brake groan. That is not to say, however, that method 100 cannot be used at higher speeds, as it can be employed across a wide range of vehicle speeds. In this particular embodiment, peak 202 has a magnitude that is greater than noise threshold 220, is within the frequency band of 0-50 Hz, and is sustained for a sufficiently long duration that it is not simply noise. Thus, step 108 may conclude that a brake vibration condition exists.

It should be appreciated that the graph in FIG. 3 and the aforementioned method for detecting the occurrence of a vibration braking condition are only exemplary, as many other techniques and methods could be used. For example, step 108 could instead: process the brake vibration data in the time domain or some other domain; average, integrate and/or otherwise evaluate the cumulative effect of the brake vibration data, instead of simply comparing peak magnitudes; evaluate calculated or estimated brake vibration data instead of evaluating actual sensor readings and output; and/or perform some other suitable signal processing technique in order to determine the occurrence of a brake vibration condition. If a brake vibration condition is not detected, then the method returns to step 102 for further monitoring. If, however, a brake vibration condition like brake groan is occurring, then the method proceeds to step 120.

In step 120, which is optional, the method attempts to determine the location of the brake vibration condition. Put differently, step 120 tries to determine the particular corner or corners from which the brake groan is emanating. As explained above, step 108 evaluates the brake vibration data from each of the vibration sensors 16-22. These evaluations should indicate if a particular corner, and hence a particular brake unit 34-40, is creating the detected brake groan. By detecting and storing the location of a particular source of a brake vibration condition along with its brake vibration data signature, method 100 can build up a database that can be used to more quickly and effectively address such conditions in the future. This information may be stored in memory device 52 of EBCM 30 or elsewhere. Consider the example where a similar brake vibration data signature is detected at some time in the future. Method 100 could infer the source of the vibrations from the stored data, or if the source of the brake vibration condition is narrowed down to one of two possible corners, then the stored data could be used to resolve this ambiguity. Furthermore, the stored brake vibration data could be used to adjust or modify one or more of the thresholds previously mentioned so that the system learns as it goes and adapts to changing conditions in the vehicle, driving behavior, etc. Although it is not normally the case, it is possible for a brake vibration condition to occur in multiple corners; in such a case, both corners could be identified and recorded. It should be appreciated that other techniques and methods may be used to determine the location of a brake vibration condition.

Step 122 generates modified brake command signals that result in braking adjustments to one or more of the brake units 34-40. A 'braking adjustment' broadly includes any adjustment—whether expressed in terms of fluid pressure, brake force, brake torque, or some other measure—that changes the amount of braking by the vehicle brake system. For example, braking adjustments may include changes to fluid pressure in hydraulic lines 70, changes to brake force exerted by calipers 82, and/or changes to brake torque exerted on rotors 80 (although, these should all be interrelated). In an exemplary embodiment, step 122 generates modified brake command signals by slightly increasing or decreasing the driver braking intent in an effort to release the offending brake unit from its current vibratory condition, but do so in a way that is not noticeable to the driver. To illustrate, assume that the driver engages the brake pedal so that a driver braking intent of 1,000 N·m (brake torque) is requested. If method 100 determines that brake groan is occurring at a front driver-side corner, for example, then step 122 may generate modified brake command signals for 1,005 N·m (increase) or 995 N·m (decrease) in an effort to release the front driver-side corner from this vibratory condition. Vehicle brake system 10 is then operated according to these modified brake command signals. This degree of braking adjustment may be large enough to stop or reduce the brake groan, but be small enough to go undetected by the driver. The amount of braking adjustment (brake fluid pressure adjustment, brake force adjustment, brake torque adjustment, etc.) may be affected by the type of vehicle brake system that is being used and the particular braking circumstances underway.

In an electrohydraulic braking (EHB) system, which is a brake-by-wire system, EBCM 30 may provide modified brake command signals to hydraulic unit 32, which uses the signals to control actuator(s) 66 and control fluid pressure in hydraulic lines 70. This, in turn, controls the brake force with which brake pistons 88 drive brake pads and brake linings into frictional engagement with rotors 80, and hence the overall brake torque at the corners. Generally speaking, an EHB system is unable to individually control the brake force at each of the vehicle's four corners; thus, two or more of the vehicle corners are provided with the same fluid pressure.

In an electromechanical braking (EMB) system, which is also a brake-by-wire system, EBCM 30 or some other module provides modified brake command signals to each of the individual brake units which includes an electric motor for driving a brake pad and lining against a rotor (e.g., an 'e-caliper'). In this type of arrangement, individual and separate brake command signals could be generated and provided to the different corners. For example, a modified brake command signal could be sent to the corner in question, while non-modified brake command signals are sent to the remaining corners; or a modified brake command signal that increases the brake force (e.g., 1,005 N·m in the above example) could be sent to a first corner, while simultaneously sending an offsetting command signal that decreases the brake force (e.g., 995 N·m) to a second corner that is diagonally from the first (the net change in brake force is zero). These are, of course, only some of the possibilities. Brake-by-wire systems are generally decoupled between the brake pedal and the source that exerts the brake force, thus, various modifications can be made to the command signals which improve the operation of the vehicle brake system and, in this case, reduce the effects of unwanted vibration.

In step 130, the method determines if the modified brake command signals of the previous step were effective at reducing or otherwise mitigating the effects of the detected brake vibration condition. In one embodiment, EBCM 30 analyzes new brake vibration data according to techniques similar to those already described in conjunction with step 108. If, for example, the magnitude or intensity of the brake vibration data is reduced by a certain threshold, say 50% or more from the original level, then the result may be satisfactory and method 100 could end (e.g., original level is 80 db and final level is 40 db or less). However, if the noise level is not reduced by this threshold, then the method can loop back to step 122 for further braking adjustments. Consider the example where, on a first pass, step 122 increments a modified brake command signal to request 1,005 N·m but step 130 determines that this modification does not result in a sufficient decrease in the brake noise. Step 122, on a second pass, could increment the modified brake command signal further (e.g., 1,010 N·m) or it could decrement the signal if there is a belief that a further increase would be ineffective (e.g., 995 N·m). The decision on which to modify the brake command signal may be aided or helped by the information stored in step 120, as the method could use historical brake vibration data to find the optimum solution. Other techniques and method could be employed in order to satisfactorily reduce or mitigate the effects of the vibratory condition.

It is to be understood that the foregoing description is not a definition of the invention, but is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as openended, meaning that that the listing is not to be considered as excluding other, additional components or items. Other terms are to be construed using their broadest reasonable meaning unless they are used in a context that requires a different interpretation.

The invention claimed is:

1. A method for operating a vehicle brake system, comprising the steps of:
   (a) measuring brake vibration data that includes at least one piece of data representative of vibrations, noise or other mechanical disturbances;
   (b) analyzing the brake vibration data and using the analyzed brake vibration data to determine if a brake vibration condition exists;
   (c) if the analyzed brake vibration data indicates that a brake vibration condition does exist, then generating a modified brake command signal that results in a braking adjustment; and
   (d) operating the vehicle brake system according to the modified brake command signal.

2. The method of claim 1, wherein step (a) further comprises gathering a vehicle speed and comparing the vehicle speed to a low speed threshold, and step (b) further comprises using the comparison and the brake vibration data to determine if the brake vibration condition exists.

3. The method of claim 2, wherein the low speed threshold is between 0-20 km/h.

4. The method of claim 2, wherein the low speed threshold is a dynamic value that is adjusted or calibrated over time.

5. The method of claim 1, wherein step (a) further comprises gathering brake pedal status information, and step (b) further comprises using the brake pedal status information and the brake vibration data to determine if the brake vibration condition exists.

6. The method of claim 1, wherein step (a) further comprises gathering the brake vibration data from a vibration sensor, and step (b) further comprises one or more of the following functions: converting the brake vibration data to a frequency domain, sampling the brake vibration data over time to remove aperiodic components, filtering the brake vibration data to evaluate a specific frequency range, or comparing the magnitude of the brake vibration data to a noise threshold.

7. The method of claim 6, wherein the vibration sensor is an acceleration sensor or accelerometer.

8. The method of claim 6, wherein step (b) further comprises filtering the brake vibration data with a double high pass filter in order to evaluate a frequency band that is between about 0-100 Hz.

9. The method of claim 6, wherein step (b) further comprises comparing the magnitude of the brake vibration data to a noise threshold that is between about 50-100 dB and determining if the magnitude of the brake vibration data stays above the noise threshold for a certain duration.

10. The method of claim 1, wherein step (b) further comprises converting the brake vibration data to a frequency domain, sampling the brake vibration data over time to remove aperiodic components, filtering the brake vibration data to evaluate a specific frequency range, and comparing the magnitude of the brake vibration data to a noise threshold to determine if the brake vibration condition exists.

11. The method of claim 1, wherein step (b) further comprises determining which corner is the source of the brake vibration condition, and storing this information for later comparison.

12. The method of claim 1, wherein the vehicle brake system is an electrohydraulic braking (EHB) system and step (c) further comprises generating and providing the modified brake command signal to a hydraulic unit so that a braking adjustment is made to the fluid pressure within one or more hydraulic lines.

13. The method of claim 1, wherein the vehicle brake system is an electromechanical braking (EMB) system and step (c) further comprises generating and providing the modified brake command signal to an electric motor at a corner of the vehicle so that a braking adjustment is made to the brake force exerted by one or more electric caliper(s).

14. The method of claim 13, wherein step (c) further comprises generating and providing a first modified brake command signal to a first brake unit and a second modified brake command signal to a second brake unit, wherein the first and second modified brake command signals are different and generally offset one another.

15. The method of claim 1, wherein step (d) further comprises determining if the modified brake command signal was effective and, if it was not effective, then generating and operating the vehicle brake system according to a second modified brake command signal.

16. A method for operating a vehicle brake system, comprising the steps of:
   (a) gathering a vehicle speed, brake status information, and brake vibration data;
   (b) using the vehicle speed, brake status information, and the brake vibration data to determine if the vehicle brake system is producing brake groan noise;
   (c) if the vehicle brake system is producing brake groan noise, then making a first braking adjustment;
   (d) determining if the first braking adjustment is effective at reducing the brake groan noise; and
   (e) if the first braking adjustment is not effective at reducing the brake groan noise, then making a second braking adjustment.

17. A brake-by-wire vehicle brake system, comprising:
   a brake pedal sensor for providing brake pedal status information;
   one or more vibration sensor(s) for providing brake vibration data;
   an electronic brake control module (EBCM) coupled to the brake pedal sensor and to the vibration sensor(s); and
   one or more disk brake unit(s) having a brake pad and a brake rotor, wherein the EBCM uses the brake pedal status information and analyzes the brake vibration data to determine if a brake vibration condition exists and, if the brake pedal status information and the analyzed brake vibration data indicate that a brake vibration condition exists, then the EBCM generates a modified brake command signal that results in a braking adjustment by the disk brake unit(s).

* * * * *